(12) United States Patent
Buchholz et al.

(10) Patent No.: US 8,337,377 B2
(45) Date of Patent: Dec. 25, 2012

(54) METHOD AND DEVICE FOR FOLDING AN AIRBAG FOR AN AIRBAG MODULE

(75) Inventors: Andre Buchholz, Berlin (DE); Dirk Franke, Berlin (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/022,932

(22) Filed: Feb. 8, 2011

(65) Prior Publication Data

US 2011/0127756 A1 Jun. 2, 2011

Related U.S. Application Data

(63) Continuation of application No. PCT/EP2009/066735, filed on Dec. 9, 2009.

(30) Foreign Application Priority Data

Dec. 10, 2008 (DE) .......... 10 2008 061 693

(51) Int. Cl.
*B31F 1/00* (2006.01)

(52) U.S. Cl. ........ 493/449; 493/405

(58) Field of Classification Search ......... 493/405, 493/449, 457, 458; 280/743.1, 728.1
See application file for complete search history.

(56) References Cited

U.S. PATENT DOCUMENTS

| | | | |
|---|---|---|---|
| 5,360,387 A * | 11/1994 | Baker | 493/405 |
| 6,115,998 A | 9/2000 | Reh et al. | |
| 6,250,675 B1 | 6/2001 | Dietsch et al. | |
| 2004/0245750 A1 | 12/2004 | Takimoto et al. | |
| 2006/0138762 A1 | 6/2006 | Jang | |
| 2008/0194393 A1 | 8/2008 | Clarke et al. | |

FOREIGN PATENT DOCUMENTS

| | | |
|---|---|---|
| DE | 195 35 564 A1 | 3/1997 |
| DE | 197 02 799 A1 | 12/1997 |
| EP | 1 243 479 A1 | 9/2002 |
| EP | 1 452 407 B1 | 9/2004 |

OTHER PUBLICATIONS

International Search Report in PCT/EP2009/066735 dated Mar. 4, 2010.

* cited by examiner

*Primary Examiner* — Sameh H. Tawfik
(74) *Attorney, Agent, or Firm* — Foley & Lardner LLP

(57) ABSTRACT

A method for folding an airbag for an airbag module in which the airbag is disposed on a support is provided. At least one piling element for folding the airbag is provided next to the exterior edge of the airbag disposed on the support. The airbag is folded together using the at least one piling element in that the piling element is moved along the support in the direction toward the interior of the airbag disposed on the support. A retainer protrudes from the at least one piling element and moving together with the piling element during the movement thereof and reaching over or under an edge area of the airbag. The at least one retainer acts on an edge area of the airbag in such a way that an undercut is formed in the airbag through the effect of the retainer.

14 Claims, 6 Drawing Sheets

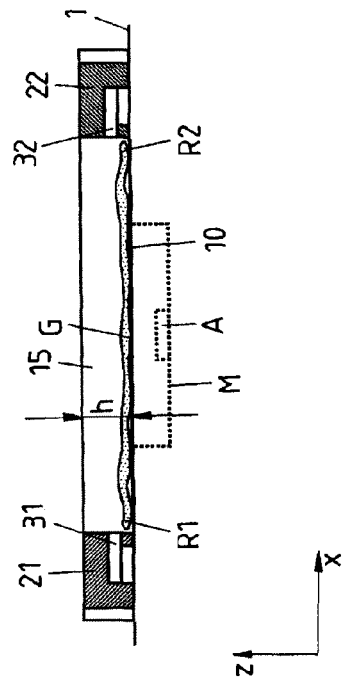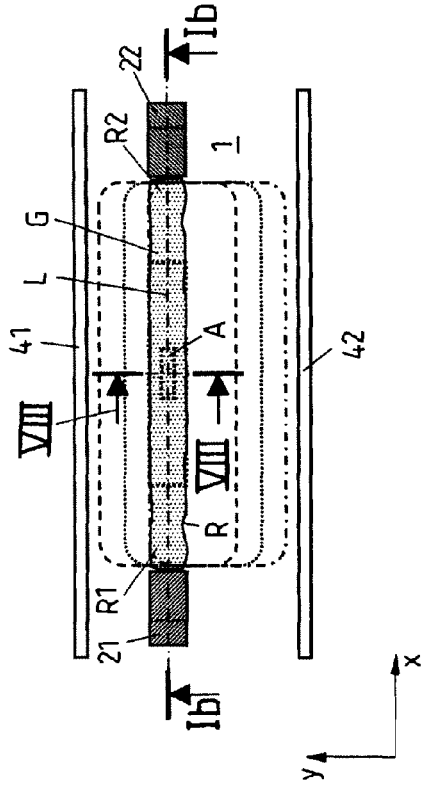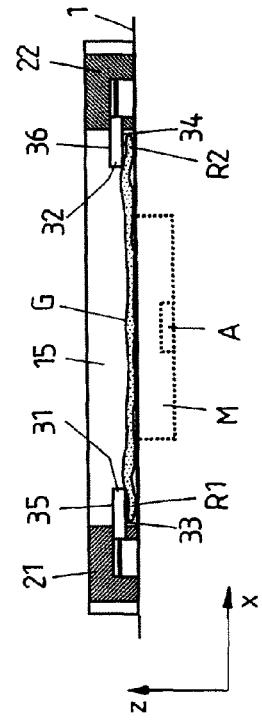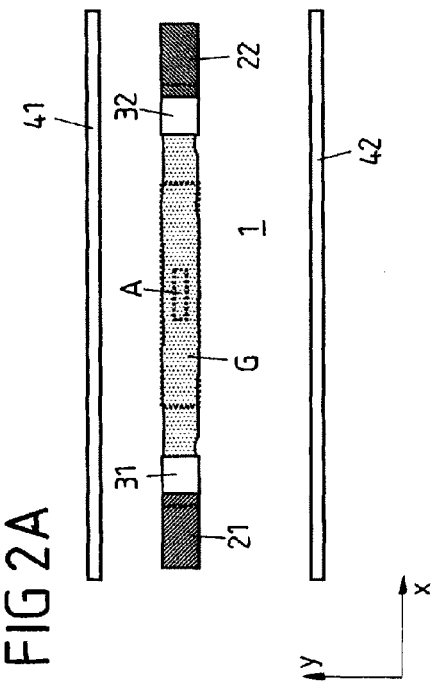

METHOD AND DEVICE FOR FOLDING AN AIRBAG FOR AN AIRBAG MODULE

CROSS-REFERENCE TO A RELATED APPLICATION

This application is a continuation of International Patent Application Number PCT/EP2009/066735, filed on Dec. 9, 2009, which was published in German as WO 2010/066792. The foregoing international application is incorporated by reference herein.

BACKGROUND

The invention relates to a method for folding an airbag for an airbag module and a device for conducting such a method.

Here, an airbag is disposed on a support and at least one piling element is provided next to the (circumferential) outer edge of the airbag disposed on the support whereby the airbag is bundled together (from its outer edge into the direction of an imaginary centre) by the means of the piling element in that the at least one folding or piling element is moved by acting onto the outer edge of the airbag along the support in direction of the inside (for instance the centre) of the airbag disposed on the support.

Such folding methods are known as so called pile foldings, compare DE 195 35 564 A1. Here, the airbag to be folded is bundled together to an airbag package by the means of multiple piling elements opposing each other pairwise, respectively. This occurs within a folding space which defines a predetermined height profile which delimits the airbag package formed by the piling folding downwards and upwards. A piling folding can basically also be carried out with only one movable piling element, for instance by arranging a stationary counter bearing opposite said piling element and the piling element is moved towards said counter bearing for folding an airbag by acting on the edge of the airbag.

At hand, a retainer protrudes from the at least one piling element which is moved together with the piling element during movement of the piling element along the support and reaches thereby over an edge area of the airbag.

In case of the method of this kind known from the US 2008/0194393 A1 a gas generator is disposed in the centre of the support which is provided for inflating the folded airbag in the event of a crash. During folding of the airbag by the means of two pairs of piling elements movable against each other a central section of the airbag is placed into folds, which continue above the gas generator. In order to prevent that the further folding areas of the folding section of the piled airbag formed next to the gas generator get caught in the folding sections located above the gas generator the folding sections formed next to the gas generator according to the known methods are being reached over from the retainer assigned to a respective piling element and prevents thereby a protruding thereof to the level of the folding sections above the gas generator.

SUMMARY

An object of the invention is to improve a method for folding an airbag of the mentioned kind, in particular in view of the generation of establishing a defined unfolding characteristic of the airbag.

According to an exemplary embodiment of the invention, it is provided that the airbag is prefolded before the at least one retainer movable together with the piling element acts thereon and that the retainer protruding from the at least one folding or piling element and movable together with said element acts on the assigned edge area of the prefolded airbag such that an undercut is formed on the edge area of the airbag by insertion of the retainer.

The retainer is thereby exemplary designed and protrudes from the assigned piling element such that by inserting the retainer into the prefolded, further to be folded airbag and the associated formation of an indentation (undercut) in each case a section of the (prefolded) airbag is placed below the retainer, e.g. between the retainer and the support, and another section of the (prefolded) airbag is placed above the retainer e.g. before a surface of the retainer facing away from the support.

Thus, airbag sections can be formed selectively above or below a respective retainer, which unfold during unfolding of the airbag by inflow of gas from an assigned gas generator particularly early or alternatively only with a delay, depending on the arrangement of the corresponding airbag section in respect to the gas stream leaving the gas generator and in respect to an outlet opening of the completed airbag module.

Thereby, the airbag is not disposed on the support in a flat spreading manner before the bundling by the means of the piling elements provided therefore; rather the airbag is already prefolded (partially bundled) before the piling element provided with a retainer acts thereon (for forming an indentation or an undercut).

The airbag can be in particular delimited or reduced by the prefolding along a (first) spatial direction to a dimension (width) which corresponds essentially to the final dimension thereof along this spatial direction (after conducting the complete folding process) so that the airbag fits already for instance along this direction in a module housing of an airbag module provided for its reception. After acting of the at least one retainer onto the airbag or the edge thereof no further folding of the airbag along the first mentioned spatial direction is anymore required so that a respective indentation (undercut) formed by the retainer cannot be influenced by later (additional) folding steps along said (first) spatial direction.

In order to guarantee a defined reproducible formation of the undercut on the lateral edge of the airbag by inserting the retainer in the (prefolded airbag) an end section of the outer edge of the airbag is fixed to the piling element from which the retainer protrudes, namely in particular below and above the retainer.

The fixation of an end section of the outer edge of the airbag on a piling element can thereby in particular be achieved by the means of fixing elements provided at the retainer, for instance by the means of clamping elements provided at the retainer or by a vertical slidable or pivotable formation of the retainer itself, which can act therefore in a clamping manner on the corresponding end sections of the airbag. Alternatively to the application of additional fixing elements or to slidable/pivotable formations of the retainer the distance between the retainer and support can be dimensioned such that a fixation of the outer edge of the airbag is guaranteed during the action of the piling element.

According to a further exemplary improvement of the invention multiple movable piling elements are designated to the folded airbag which at first are located next to the circumferential outer edge of the airbag and which are moved for folding (bundling together) of the airbag in each case by acting on an edge area of the airbag in direction of the inside of the airbag, namely along the support on which the airbag is disposed on. Thereby to at least one part of the multiple piling elements, thus at least one of the piling elements, a retainer protruding thereof is assigned which penetrates during impact on the airbag into the forming airbag package and forms an undercut.

Thereby, two respective piling elements can be arranged pairwise opposite to each other so that these are moved towards each other during folding of the airbag. Advantageously, each of the two piling elements has at least in case of one pair of piling elements opposing each other a respective retainer which protrudes thereof.

If for instance four piling elements are provided, which in each case are arranged opposite to each other and are moved towards each other during folding of the airbag, a folding space can be delimited on four sides, thus in particular in all spatial directions along the support on which the to be folded airbag is disposed on and along which the piling elements are moved for folding the airbag.

If in contrast only two of the each other opposing piling elements are provided, which are moved towards each other during folding of the airbag, the folding space for the to be folded airbag is thus only delimited along two (each other opposing) spatial directions, which continue along the support of the airbag. For a restriction of the folding space along the hereto vertical spatial directions, however simultaneously along the support, additional (not designed as piling elements) lateral limiting elements of the folding space can serve in this case.

In order to furthermore define a certain height profile within which the airbag is folded (bundled together) during moving the piling elements, a cover is arranged opposite to the support, which delimits the folding space upwards, thus along a direction away from the support for the airbag, so that latter one is bundled together while moving the piling element between the support and the cover, so that also the support and the cover define the height profile within which the folding of the airbag occurs.

The main purpose of folding or bundling together an airbag to an airbag package consists in stowing the airbag in a module housing within which the airbag can be then assembled into a motor vehicle. At present, the module housing is preferably arranged below the support for the airbag, for instance in a receptacle provided below the support, whereby the support has an opening above the receptacle so that the receptacle with the module housing is accessible from above of the support.

By integrating a punch movable in vertical direction e.g. essentially vertical to the support into the cover, which restricts the folding space upwards, said punch can be used for pushing the piled airbag terminally into the module housing arranged below the support, whereby in said housing already the gas generator serving the inflation of the airbag can be provided. The airbag can thereby be already prefixed on the module housing before the folding process.

Thus, the airbag can for instance be already prefolded before disposing on the support or in the folding space, for instance by once or multiple turning over or by rolling. On the other hand, the airbag can also only be prefolded after disposing on the support or in the folding space, for instance by the initial action of folding elements without retainer here upon, before subsequently piling elements provided with a retainer are used for folding the airbag.

Hereby it can be provided concretely that the airbag is initially prefolded into a longish, longitudinal extending form before at least one piling element provided with a retainer acts here upon, and namely in particular onto a respective end face of the longitudinal extending prefolded airbag which extends between two end faces.

In case the airbag has been prefolded before at least one piling element provided with a retainer acts here upon the outer edge of the airbag next to which the piling elements are arranged and onto which the piling element's act is to be understood not to be the outer edge of the flat spreaded airbag but rather the outer edge of the already prefolded airbag as disposed on the support.

E.g., the outer edge of the airbag disposed on the support is to be understood as being a lateral restriction of the airbag revolving annular along the support in the form in which the airbag is present in the moment in which at least one piling element and an assigned retainer act here upon.

The described method is in particular suitable for folding an airbag for a so called knee airbag module, e.g. for an airbag module whose airbag is inflatable for protection of the knee of a passenger sitting in a motor vehicle.

BRIEF DESCRIPTION OF THE DRAWINGS

Further details and advantages of the invention become apparent in the following description of the embodiments with reference to the Figures.

FIG. 1A shows a top view on a folding device for folding of an airbag disposed on a support together with the airbag to be folded.

FIG. 1B shows a longitudinal section of the device of FIG. 1A.

FIG. 2A shows the device of FIG. 1A after prefolding the airbag to be folded.

FIG. 2B shows a longitudinal section of the arrangement of FIG. 2A.

DETAILED DESCRIPTION

Figure 3A:
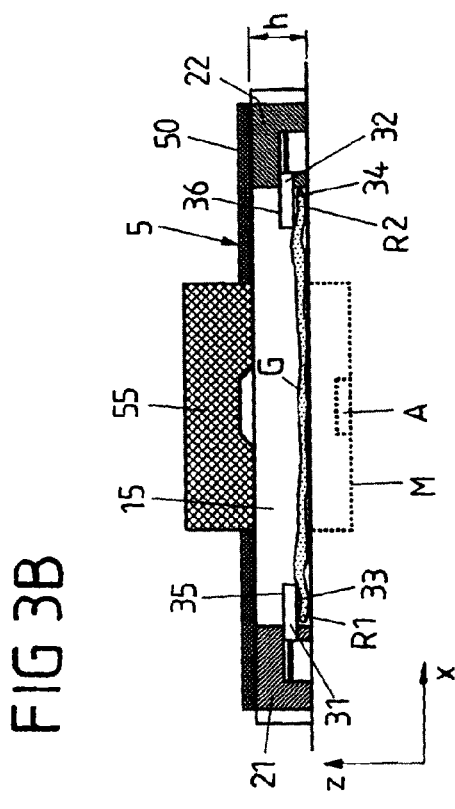
FIG. 3A shows the arrangement of FIG. 2A after obtaining a lateral and an upper limitation of a folding space for the airbag to be folded.

In FIGS. 1A and 1B a folding device for folding an airbag G is shown in a top view (FIG. 1A) and in a longitudinal section (FIG. 1B), the airbag being arranged on a support 1 of the folding device being essentially flat in the embodiment. The support 1 can be in particular a surface of a folding table.

The folding device defines a folding space 15 in which the airbag G to be folded is supposed to be bundled together to an airbag package. The folding space 15 is—if looked at along the vertical axis z continuing lateral to the support 1—delimited downward by the support 1 and upward by the cover side recognizable in FIG. 3B. The support 1 and the cover 5 define a certain height profile within which the to be folded airbag G is to be bundled together to an airbag package. At present the height H determined as the vertical distance between support 1 and cover 5 is essentially constant so that the folding space 15 has an essentially location independent height H. However, also other more complicated height profiles can also be provided. (In the status shown in the FIGS. 1A and 1B the cover 5 has not yet been lowered to the position shown in FIG. 3B, in which the cover delimits the folding space 15 upwards as intended in order to allow at first the arrangement of the airbag G on the support 1 in the folding space 15.)

In the result, a support 1 and the cover 5 delimit the folding space 15 along the two spatial directions −z and z continuing vertical to the support 1 and define hereby the height profile.

Along the remaining spatial directions x, −x, y and −y extending essentially along the support 1 the folding space 15 is delimited by two piling elements 21, 22 movable towards each other in longitudinal direction x and by two lateral limiting elements 41, 42 movable towards each other along the horizontal cross direction y.

The two piling elements 21, 22 are thereby arranged opposite to each other along the longitudinal axis x continuing parallel to the support 1 and movable towards each other along said axis in order to be able to fold the airbag G disposed on the support 1 in the folding space 15 to an airbag package.

The two lateral limiting elements 41, 42 are opposed to each other along the horizontal cross axis y which also continues parallel to the support 1 but thereby vertical to the longitudinal axis x. The two lateral limiting elements 41, 42 are also movable towards each other along the axis (y) along which they are opposing each other, however at present not for folding the airbag G but in order to adjust the width of the folding space 15 in a variable manner. In a modified embodiment the lateral limiting elements 41, 42 can be however designed as piling elements, which act there upon for bundling together the airbag G.

Below a central section of the support 1 (in the embodiment about central between the two piling elements 21, 22 and the two lateral limiting elements 41, 42) a free space is provided, in which a module housing M with an inserted inflating device A (gas generator) and a fixing or gas distribution device (diffuser) assigned thereon is housed, whereby latter one can be also designed for fixing the airbag G on the module housing M. Alternatively, the inflator device A can also be arranged outside of the module housing M.

The module housing M serves for the reception of the airbag G after the airbag is being folded to an airbag package as intended by the means of the folding device shown in the FIGS. 1A and 1B. In order to stow the folded airbag finally in the module housing M the support 1 has a through opening 10 above the free space housing the module housing M.

In FIG. 1A different possibilities of arranging a to be folded airbag on the support 10 are indicated by the means of a dashed line, a dotted line and a dashed-and-dotted line, for instance symmetrically relatively to the centre axis L (dashed line) extending parallel to the longitudinal axis x continuing between the two piling elements 21, 22; asymmetrically relatively to said centre axis L (dotted line); or also essentially one sided relatively to said centre axis L (dashed-and-dotted line).

The arrangement of the airbag on the support 1 as shown in the FIGS. 1A and 1B is possible since the lateral limiting elements 41, 42 have in the status shown in the FIGS. 1A and 1B such a large distance along the horizontal cross axis y so that the (initially flat spreaded) airbag can be housed here in-between. Accordingly, this is also true for the distance of the piling elements 21, 22 along the longitudinal axis x.

For a defined fixation of the to be folded airbag G on the support 1 can thereby in particular be provided that the airbag G is assigned to the module housing M arranged immediately below a support 1.

A distinctive feature of the folding device shown in the FIGS. 1A and 1B consist therein that on the piling elements 21, 22 a respective retainer 31 or 32 is provided which contributes in the embodiment by fixing the airbag on the respective piling element 21, 22 but also by shaping the airbag package obtained during folding.

In the embodiment however, the airbag spreaded directly flat on the support 1 as shown in FIG. 1A in dashed, dotted and dashed-and-dotted form is not folded by the means of the piling elements 21, 22; but rather the airbag G is transferred beforehand by prefolding into a prefolded (longitudinal) shape as shown in the respective FIGS. 1A and 1B.

Figure 8A:
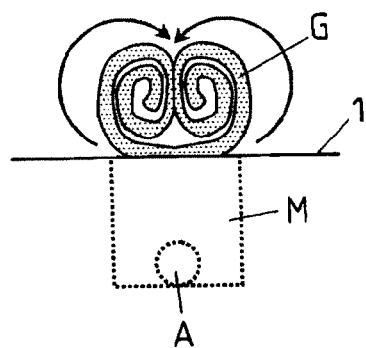
FIG. 8A shows a first variant for prefolding the airbag.
Figure 8B:
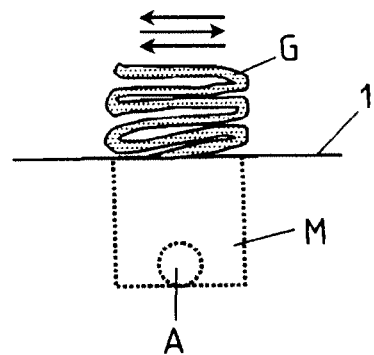
FIG. 8B shows a second variant for prefolding the airbag.
Figure 8C:
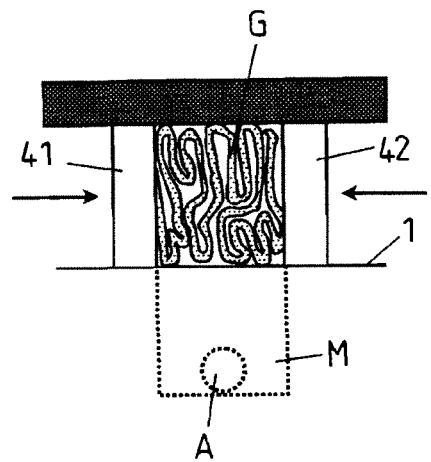
FIG. 8C shows a third variant for prefolding the airbag.

Different embodiments of the (longitudinal extending) prefolded airbag are shown in cross section in the FIGS. 8A to 8C in each case in cross section whereby the airbag G is reduced along a direction (y) of the prefolding to such a dimension (width) so that the airbag fits in respect to its dimension along this direction (y) already into a module housing M provided for the reception of a (completely folded) airbag G.

According to FIG. 8A the airbag G is rolled together along the horizontal cross axis y towards the centre axis L and namely equally from both sides on both sides of the centre axis L. In case of a one sided arrangement of the airbag relatively to the centre axis L on the support 1 a one-sided uprolling of the airbag G can in particular alternatively occur. A one-sided prefolding is also shown in the embodiment of FIG. 8B according to which the airbag G was multiple turned over, and namely with changing directions of turning over. In analogy to the embodiment of the FIG. 8A a prefolding on both sides can occur through a turning over in case of an appropriate arrangement of airbag G.

The folding variants shown in FIGS. 8A and 8B can also be carried out manually, respectively.

In embodiment of FIG. 8C the airbag G is bundled together by the means of lateral folding or piling elements 41, 42, which can be for instance formed by the lateral limiting elements 41, 42 of FIGS. 1A and 1B, to a (along the longitudinal axis x) longitudinal extending form, namely by bundling together a longer horizontal cross axis y. For this reason it is suitable to restrict the folding space by previous applying (lowering) of the cover 5 upwards.

The shown prefoldings have in common that the airbag G has been compressed along the horizontal cross axis y, thus lateral to the vertical axis z as well as to the longitudinal axis x to such a width which corresponds approximately to the width of the module housing M in said direction y. Therefore, the prefolded airbag G does not have to be bundled together any further along the horizontal cross axis y in order to be stowed away in the module housing M.

Besides from the indicated (dashed, dotted or dashed-and-dotted) illustration of an airbag flatly spreaded on the support 1 the illustrations of the airbag G in the FIG. 1A ff. relate in each case to an already prefolded airbag, for instance according to one of the folding profiles of FIGS. 8A to 8C, which has presently a longitudinal extended form.

Insofar the outer edge of the airbag G is subsequently discussed, hereby not the annular revolving outer edge of the flatly spreaded airbag is meant as deducible in FIG. 1A in dashed, dotted or dashed-and-dotted illustration, but rather the annular revolving outer edge of the already longitudinal extended prefolded airbag G is meant which revolves as outer edge R in FIG. 1A in straight line annular along the prefolded airbag G.

Accordingly, the upper side or lower side of the airbag G relate in each case to the upper and lower side of the prefolded airbag G, namely if looked at along the vertical axis z.

In the FIGS. 2A and 2B the folding device of the FIGS. 1A and 1B is shown in a status in which the respective retainer 31, 32 which is provided on each of the two piling elements 21, 22, has been deployed along the longitudinal axis x so that the retainer protrudes now along said longitudinal axis from the assigned piling element 21 or 22.

As it becomes in particular apparent by the means of FIG. 2B, the respective retainer 31, 32 protrudes from the assigned piling element 21, 22 in such a vertical height that the respective retainer 31, 32 extends with the lower side 33 or 34 thereof facing the support 1 above the edge area R1, R2 of the outer edge R of the airbag G adjacent to the respective piling element 21, 22. E.g., the respective retainer 31, 32 reaches over an edge area R1, R2 of the airbag G which continues adjacent to an assigned piling element 21, 22. The selected vertical distance of the lower side 33, 34 of a respective retainer 31, 32 from the support 1 depends thereby amongst others on the vertical dimension (thickness) of the respective edge area R1, R2 to be reached over of the optionally prefolded airbag G. The stronger the airbag G is prefolded, the larger its vertical dimension along the vertical axis z can be and the larger has to be accordingly the vertical distance of the lower side 33, 34 of a respective retainer 31, 32 from the support 1. For this reason, in an embodiment it can be provided that the vertical position of the retainer 31, 32 is adjustable along the vertical axis z.

Figure 3B:
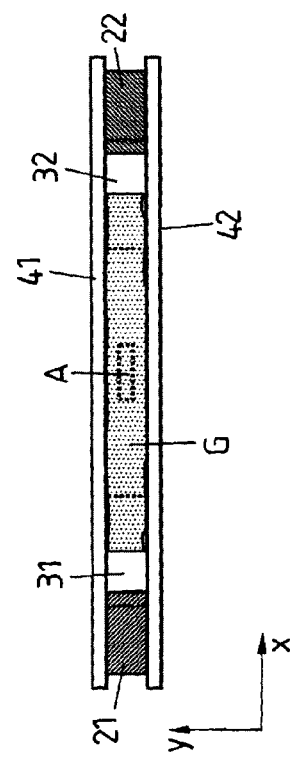
FIG. 3B shows a longitudinal section of the arrangement of FIG. 3A.

Furthermore, the retainer 31, 32 has along the vertical axis z such (low) dimension (height) so that the upper side 35, 36 of the respective retainer 31, 32 is substantially distanced from the cover 5 delimiting the folding space upwards, compare FIG. 3B.

At present, the retainer 31, 32 serve not only therefore to reach over a respective assigned edge area R1, R2 on the outer edge R of the airbag G but it also serves the fixation of the respective edge area R1, R2 to the adjacently located piling element 21 or 22. In concrete, the edge areas R1, R2 of the outer edge R of the prefolded airbag G being distanced from each other along the longitudinal axis x and facing each other are fixed on one of the piling elements 21, 22, respectively. Different variants of how such a fixation can be concretely realized are shown in the FIGS. 9A to 9C which show in each case a detail of FIG. 2B in the section of a piling element 21 and the retainer 31 protruding thereof.

Figure 9C:
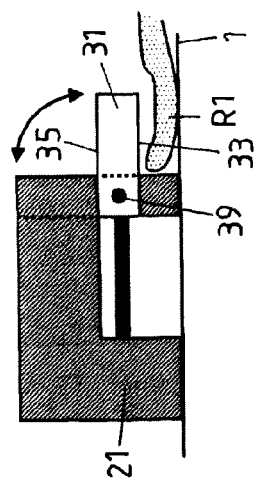
FIG. 9C shows a third embodiment of fixing means for fixation of an edge area of the airbag on a piling element.
Figure 9B:
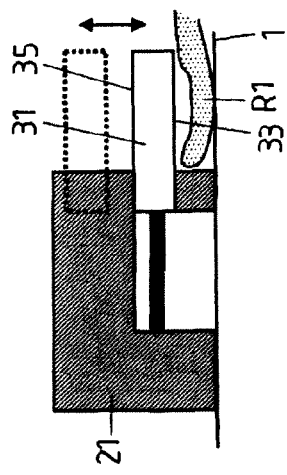
FIG. 9B shows a second embodiment of fixing means for fixation of an edge area of the airbag on a piling element.
Figure 9A:
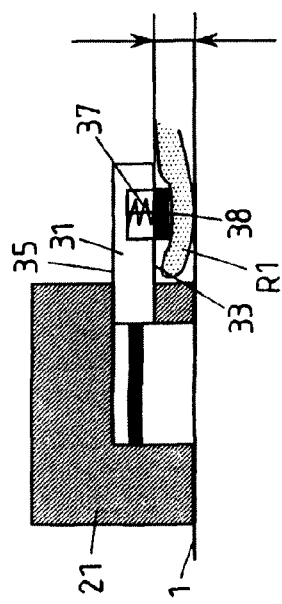
FIG. 9A shows a first embodiment of fixing means for fixation of an edge area of the airbag on a piling element.

In the embodiment according to FIG. 9A, the respective retainer (for instance 31) acts via a clamping element 38 elastically preloaded by the means of a spring element 37 on the assigned edge area (for instance R1) of the airbag G in order to clamp the same between the retainer (31) and the support 1.

According to the embodiment of FIG. 9B the respective retainer (31) is movable along the vertical axis z in order to be able to clamp an edge area (R1) of the airbag G between said retainer, more specific its lower side (33), and the support 1. In the embodiment of FIG. 9C the respective retainer (31) is pivotably rested against an assigned piling element (21) for the appropriate purpose (around a joint 39).

Therefore, in the embodiments of FIGS. 9B and 9C the fixing elements serving the fixation of a respective edge area R1, R2 of the airbag G on a piling element 21, 22 coincide with the respective retainer 31, 32 while according to the embodiment of FIG. 9A separate fixing means 37, 38 in form of a clamping device are provided.

In particular, the fixing elements shown in FIG. 9A and FIG. 9B (in form of a separate clamping device 37, 38 or in form of a vertical movable retainer 31) are suitable thereby also for fixation of edge areas R1, R2 with different vertical dimensions (thickness) along the vertical axis z.

Of course, also further fixing means can be used besides the exemplarily in FIGS. 9A to 9C shown fixing elements in order to fix a respective edge area R1, R2 of the airbag on the adjacently located piling elements 21, 22.

After fixation of the edge areas R1, R2 of the longitudinal extended prefolded airbag G opposing each other along the longitudinal axis x on each of the piling elements 21, 22 the folding space 15 for conducting a subsequent bundling together is delimited, compare FIGS. 3B and 3B.

For this reason, the lateral limiting elements 41, 42 of the folding device (by means of assigned automatic, for instance electromotive or pneumatically driven sliders) are moved along the horizontal cross axis y towards each other until their distance corresponds to the width of the module housing M along the horizontal cross axis y so that the airbag pre-folded in the folding bag 15 can be subsequently stowed in said module housing M. In the embodiment the lateral limiting elements 41, 42 do not act substantially while moving towards each other along the horizontal cross axis y onto the airbag G since this has already been pre-folded so that its dimension along the horizontal cross axis y already corresponds essentially to the width of the module housing M. Alternatively, the airbag G can also be pre-folded during movement of the two lateral limiting elements 41, 42 towards each other into a longitudinal extending form; in this case the lateral limiting elements 41, 42 serve simultaneously as folding or piling elements.

Furthermore, the height profile of the folding space 15 is determined by positioning a cover 5 in a defined distance along the vertical axis z above the support 1. The cover 5 consists at present of a cover plate 50 with a central opening in which a packing punch 55 is positioned. The packing punch 55 is arranged in opposite to a free space below the support 1 of the provided module housing M and has such dimensions in the plane upright to the vertical axis z so that the airbag G can be pushed herewith after bundling together into the module housing M.

The lowering of the cover 5 to a defined height above the support 1 in order to establish a height profile of the folding space 15 can also occur already according to modification of the shown embodiment before the fixation of the edge area R1, R2 of the pre-folded airbag G on the piling element 21, 22. In this case said fixation is practically be done pure automatically since a manual access to the folding space 15 after lowering the cover 5—depending on construction in a singular case—is hindered or even impossible. For possible modifications of the fixing means reference is made to the previously described variance of the FIGS. 9A to 9C.

Figure 4A:
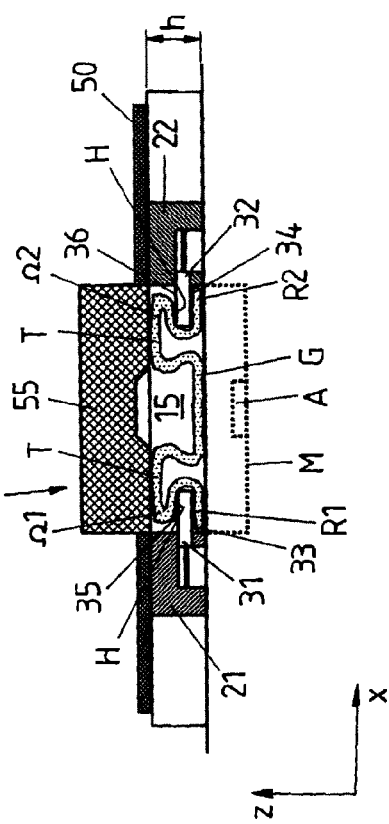
FIG. 4A shows the arrangement of FIG. 3A according to a method of piling elements opposing each other with retainers protruding thereof for folding the airbag.
Figure 4B:
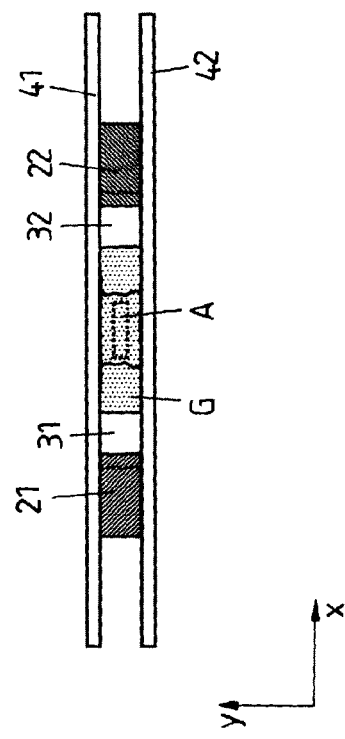
FIG. 4B shows a longitudinal section of the arrangement of FIG. 4A.

After defining the folding space 15 the two piling elements 21, 22 opposing each other along the longitudinal axis x are subsequently moved according to the FIGS. 4A and 4B (by means of assigned automatic, for instance electromotive or pneumatic driven sliders) along said axis x towards each other whereby already along the horizontal cross axis Y pre-folded airbag is now also pushed together, more specific bundled together, along the longitudinal axis x. Hereby a particular form is imposed through this on the airbag G so that on the one hand its edge areas R1, R2 opposing each other along the longitudinal axis x are fixed onto their corresponding piling elements 21, 22, respectively, whereby they are reached over by one of the respective retainers 31, 32, and that said piling element 21, 22 act on the airbag G in particular via the retainer 31, 32 protruding thereof along the longitudinal axis x, in order to bundle together the airbag G.

When compressing the airbag G along the longitudinal axis x by moving the piling elements 21, 22 the end sections of the outer edge areas R1, R2 of the airbag G remain in each case below the retainer 31, 32 of the corresponding piling elements 21, 22. More precise, said end sections are housed during the piling process permanently between the lower side 33, 34 of the respective retainer 31, 32 and the support; this is guaranteed by fixation of the edge areas R1, R2 of the airbag G on the respective piling element 21, 22.

Due to the vertical limitation of this folding space 15 upwards by means of the cover 5, the impact of the piling elements 21, 22 on the airbag G via the retainer 31, 32 protruding forward from the piling elements 21, 22 along the longitudinal axis x results in obtaining an undercut H in the forming airbag package (on the respective edge areas R1, R2) and therefore a respective section adjacent to the corresponding edge areas R1, R2 of the airbag G reaches over the corresponding retainer 31, 32 and is housed between its upper sides 35 or 36 and the cover 5.

Due to the additional fixation of the airbag G in a central section on the module housing M, the airbag sections adjacent to the edge areas R1, R2 towards the inside have together with said edge areas in the pre-folded status in the profile approximately the shape of an $\Omega$, for which reason they are also designated as Omega-folds $\Omega 1$, $\Omega 2$. Due to the already described fixation of the edge areas R1, R2 of the airbag between a respective retainer 31, 32 and the support 1 and due to the spacing of the upper side 35, 32 of a respective retainer 31, 32 from the cover 5 so that during piling of the airbag G an airbag section can be housed in their between, the bulges T of the respective Omega-folds $\Omega 1$, $\Omega 2$ face the cover 5 in the embodiment of the FIGS. 4A and 4B and rest against this one.

The piling elements 21, 22 are moved together while compressing the airbag G along the longitudinal axis x so far that the dimension of the compressed airbag G along said axis x corresponds to the length of the module housing M. Through this the airbag G can be stored subsequently without a problem in the module housing M.

The desired folding forms of the compressed airbag G can be varied thereby for instance by the penetration depth (length) of the retainer 31, 32 along the longitudinal axis x by positioning the retainer 31, 32 along the vertical axis z and its thickness along said axis z and furthermore by the heights profile (thus in particular the vertical extension H) of the folding space 15.

Figure 5A:
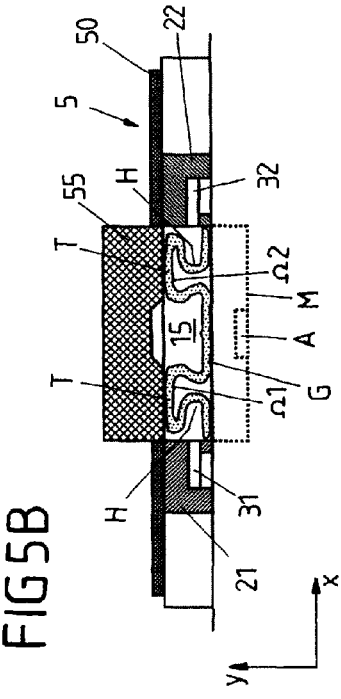
FIG. 5A shows the arrangement of FIG. 4A after inserting a retainer provided on the piling elements.
Figure 5B:
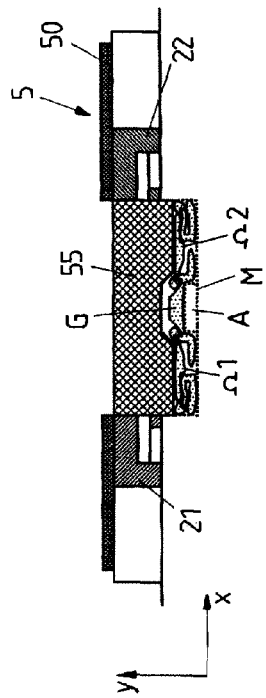
FIG. 5B shows a longitudinal section of the arrangement of FIG. 5A.

After compressing the airbag G along the longitudinal axis x to a dimension corresponding the length housing M along the x-axis, the retainers 31, 32 are being at first retracted so that these do not protrude any longer into the folded airbag G, compare FIGS. 5A and 5B.

Subsequently, the airbag G is stored in the module housing by means of the packing punch 55 provided therefore by moving the packing punch 55 according to FIG. 6 opposite to the vertical axis z in the direction towards the support 1 whereby it acts on the folding airbag G and pushes the airbag into the module housing M. Hereby the Omega folds $\Omega 1$, $\Omega 2$ are compressed flatly; however, their (now flattened) bulges T remain on the upper side facing (the cover 5 or more exact the packing punch 55) of the airbag G now stowed in the module housing M. In other words the compressed bulges T of the Omega-folds $\Omega 1$, $\Omega 2$ continue next below the upper opening of the module housing M through which the airbag G was pushed into the module housing M by means of the packing punch 55.

Figure 7A:
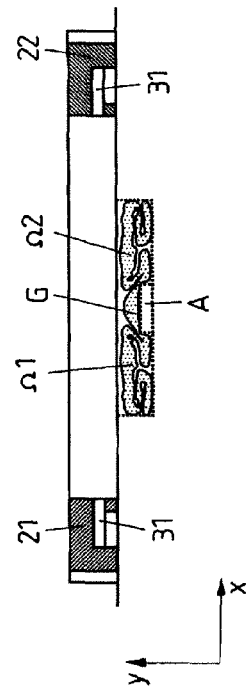
FIG. 7A shows a top view of the arrangement of FIG. 6 after releasing the module housing with the stowed airbag.
Figure 7B:
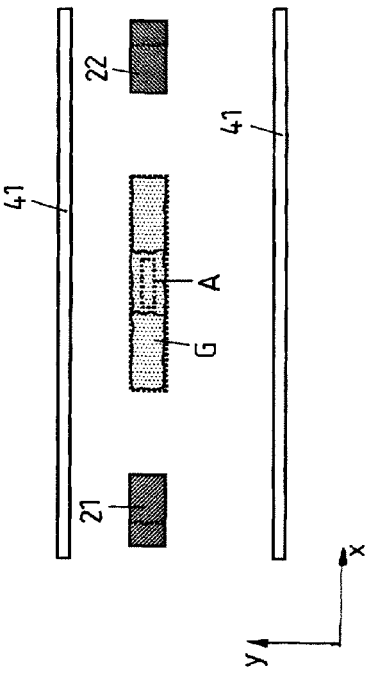
FIG. 7B shows a longitudinal section of the arrangement of FIG. 7A.

Finally, the piling elements 21, 22, the lateral limiting elements 41, 42 and the cover 5 are moved according to the FIGS. 7A and 7B along their respective moving direction x, y or z so that the folding space 15 lays open for a removal of a module housing M together with the airbag G stowed therein.

Figure 10:
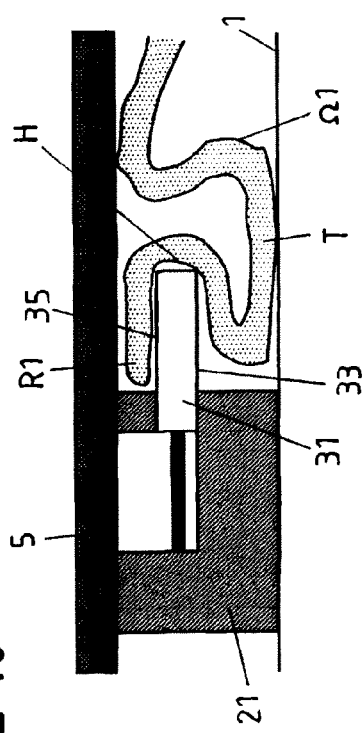
FIG. 10 shows a modification of the embodiment of the FIGS. 1A to 7B in respect to the arrangement of the edge area of the airbag on the respective piling element.

FIG. 10 shows a modification of the embodiment shown in the FIGS. 1A to 7B in respect to the arrangement of a respective edge section (for instance R1) of the airbag G relatively to the assigned piling elements (for instance 21) and the corresponding retainer (21).

In case of the FIG. 10 the considered edge area R1 of the longitudinal extending pre-folded airbag is arranged between the corresponding retainer 31 and the cover 5, more exact between the upper side 35 of the retainer 31 and the cover plate 50 of the cover 5. In this case the end section of the edge area R1 of the pre-folded airbag G is not being reached over by the retainer 31—as in case of FIGS. 1A to 7B—but rather is being reached under.

A fixation of the edge area R1 between the retainer 31 and the cover 5 can thereby occur in the manner that the edge section R1 is laid onto the retainer 31 or its upper side 35 before the cover 5 is lowered for restricting the height profile of the folding space 15. When lowering the cover 5 then a clamping of the edge R1 of the airbag occurs between the retainer 31 or its upper side 35 and the cover 5 or more specific its cover plate 50.

Alternatively, measures described by means of the FIGS. 9A to 9C for fixation of the considered edge area R1 of the airbag G on the corresponding piling element 21 can be consulted with the difference that the fixation of the edge area R1 does not occur below but more above the retainer 31. In contrast to the embodiment of the FIGS. 1A to 7B the airbag in the arrangement of FIG. 10 is pushed against the support 1 in the section of the so-called Omega-folds $\Omega 1$, $\Omega 2$ with its bulged section T.

The tubular airbag shown in each case schematically in the FIGS. 1A to 7B and in FIG. 10, shall thereby, as exemplary shown in the FIGS. 8A to 8C, have been already pre-folded to a longitudinal form. That means that this schematically tubular shown element G from the FIGS. 1A to 7B and FIG. 10 represent in each case an airbag being pre-folded to a longitudinal extended form which has in the cross section for instance a configuration of the FIG. 8A, 8B or 8C. This is indicated in FIG. 1A by the cross section line VIII-VIII which points out that the pre-folded airbag G shown tubular-like in FIG. 1A can correspond to one of the FIG. 8A, 8B or 8C.

Accordingly the airbag G has in a respective Omega-fold $\Omega 1$, $\Omega 2$ still respective sub-folds since the said Omega-like folded airbag section is already pre-folded.

Figure 6:
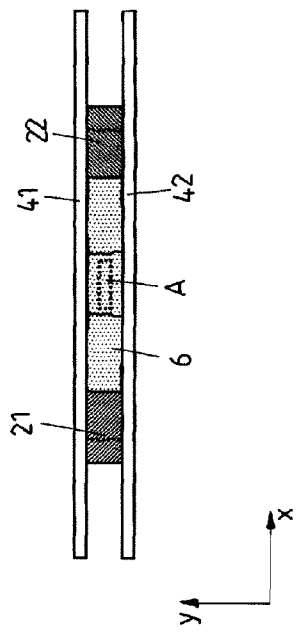
FIG. 6 shows an arrangement of FIG. 5B during pushing the folded airbag into a module housing arranged below the support for the airbag by the means of a punch.

After stowing an airbag package folded according to FIG. 10 in a module housing M, compare FIG. 6, the bulged sub-sections T of the Omega-fold $\Omega 1$, $\Omega 2$ are not—as in case of FIG. 6—in the area of upper outlet opening O of the module housing M but are rather arranged in the area of the opposing floor space of the module housing M at which also the inflating device A is arranged.

This means that in a arrangement of the kind shown in FIG. 10 the bulged sub-sections T of the Omega-folds can leave the module housing M only with a delay after activation of the inflating device A and the therewith connected inflating of the airbag G since at first airbag sections located closer to the outlet opening O of the module housing M unfold out of the module housing M. In return, in case of the arrangement shown in the FIGS. 5B, 6 and 7B, by activating the inflating device A occurs at first a discharge of the bulged subsections T of the Omega-folds $\Omega 1$, $\Omega 2$ from the outlet openings O of the module housing M since the bulged subsections T of said Omega-folds $\Omega 1$, $\Omega 2$ are adjacent next to the upper outlet opening O of the module housing M. In this case the bulged subsections of Omega-folds $\Omega 1$, $\Omega 2$ release therefore in particular early the module housing M after the inflating device A has been activated.

Figure 11:
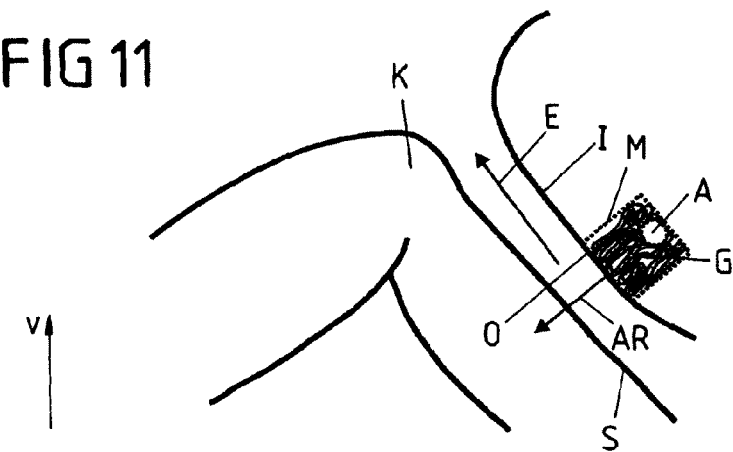
FIG. 11 shows a possible mounting position of a folded airbag stowed in the airbag module in a motor vehicle by applying as a knee protection.

FIG. 11 shows schematically a cross section of an airbag module with a module housing M, with a compressed airbag G arranged therein and an inflating device A also arranged in a module housing M, which is arranged in the area of the instrument panel I of a motor vehicle in front of a shin S of a person accordingly sitting in the motor vehicle. The module housing M has an outlet opening O lockable by means of the cover which rests on the side of the instrument panel I facing the passenger to be protected and which is being opened during inflation and unfolding of the airbag G arranged in the module housing M in a known manner, for instance as the cover of the module M is ripped open along a pre-defined weakening or ripping line. The module housing M rests thereby with its outlet opening O—if looked at along the vertical vehicle axis v—somewhat below the knee K of the respective passenger to be mainly protected by the airbag module.

In such an arranged airbag module the airbag G compressed in the module housing M shall unfold through its outlet opening O at first along an ejection direction AR (essentially vertical to the surface of the instrument panel I facing the vehicle interior) in direction of the shin S of the passenger to be protected and extend then in an unfolding direction E, which continues somehow along the shin of the passenger so that sections of the airbag G are being placed before the knees K of a passenger to be protected.

The previously described folding of an airbag of an airbag module by means of FIGS. 1A to 10, in particular for a knee-airbag module is supposed to influence or steer in particular the first phase of the unfolding of the airbag G, thus related to the illustration of the FIG. 11, the unfolding along the ejection direction AR.

Figure 12A:
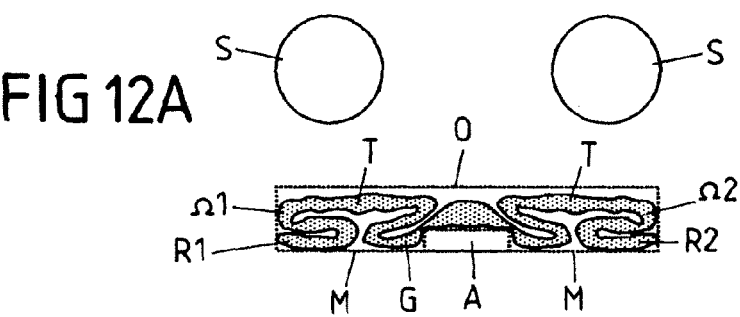
FIG. 12A shows the unfolding of an airbag of an airbag folded according to the FIG. 1A to 7B by assembling according to FIG. 11.

FIG. 12A shows a section through an airbag module that in principle is arranged for the protection of knee K of the passenger as the airbag module shown in FIG. 11, whereby however at present the airbag G was compressed according to the embodiment of the FIGS. 1A to 7B to an airbag package stored in the module housing M.

FIG. 12A shows a section of an airbag module in a cutting plane which is spanned by the ejection direction AR from FIG. 11 and by the longitudinal axis of the inflation device A in form of a tubular gas generator arranged in the module housing M. In the non-activated status of the airbag module, e.g. before the releasing the inflation device A for inflating the gas into the airbag G, the flatly pressed bulged T of the airbag G, here in form of subsections T of the Omega-folds $\Omega 1$, $\Omega 2$ rest against the upper side of the module housing M and are immediately adjacent to the outlet opening O of the module housing M through which the airbag G can be released during inflating and unfolding.

When the inflating device A is being released in the event of a crash, gases are released for inflating the airbag G, which is thereby filled with gas and unfolds accordingly. The inflating device A can be designed thereby in a known manner as cold gas generator for releasing a gas stored in the inflating device or a so-called hot-gas generator for releasing a gas formed by activating the inflating device through chemical reactions. Alternatively, a hybrid-gas generator can further more be used which releases after activation a mixture of a cold gas stored in the inflating device and a hot gas obtained by a chemical reaction.

The gases flowing out of the inflating device A enter at first the section of the airbag G which rests against the inflating device A or a diffuser communicating herewith. For this reason corresponding outlet openings are provided on the mentioned parts, which correspond with at least one inflation opening on the airbag G.

The central airbag section resting against the inflation device A or against the diffuser is followed by the bulges T of the airbag G adjacent to the outlet opening O of the airbag module M, which are subsections of the Omega-folds $\Omega 1$, $\Omega 2$. These are filled with gas early during inflation of the airbag G according FIG. 12B, leave along the ejection direction AR in direction of the shin S of the passenger to be protected and apply fast on said shins.

The airbag section of the airbag G resting against the inflation device A or against the diffuser unfolds thereby between these two bulges T through the outlet opening O of the module housing M in direction of the exterior space.

The edge areas R1, R2 of the airbag G fixated during the folding of the airbag G by means of the retainer 31, 32 remain on the other hand at first in the module housing since for these only after unfolding of the bulges T the path is free for an unfolding through the outlet opening O of the module housing M.

Figure 12B:
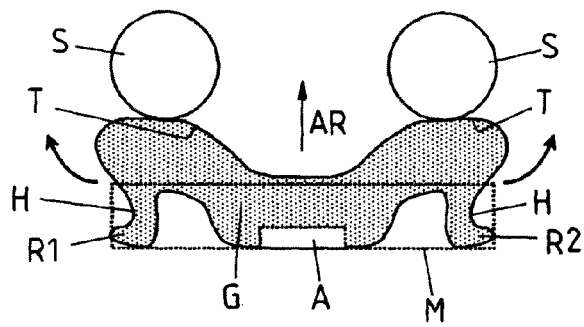
FIG. 12B shows the unfolding of an airbag of an airbag folded according to the FIG. 1A to 7B by assembling according to FIG. 11.

Already in the early phase as shown in FIG. 12B during inflation of the airbag G said airbag provides a protection potential for the passenger to be protected since the bulges T unfolding out of the module housing M cover the part of the instrumentation panel I located before the shins S, compare FIG. 11, and apply further to the shins S.

Figure 12C:
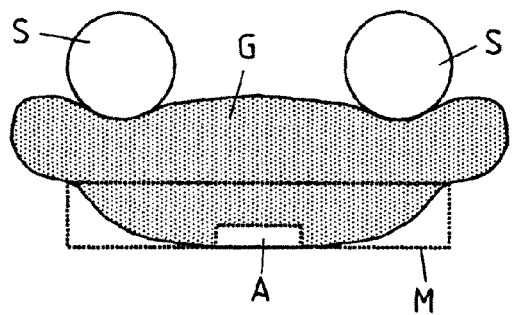
FIG. 12C shows the unfolding of an airbag of an airbag folded according to the FIG. 1A to 7B by assembling according to FIG. 11.

In case of the further lateral unfolding of the airbag G represented by the transfer from FIG. 12B to FIG. 12C, compare the lateral arrows in FIG. 12B, the bulges T of the airbag G resting against the shins S remain in their previously taken position so that at these locations no substantial relative movement between the shin S of a passenger to be protected and the airbag sections resting against thereon occurs. This is the result of a fast, defined positioning of the airbag G already in an early stadium of unfolding, as shown in FIG. 12B.

During final lateral unfolding of the airbag, in which also the edge areas R1, R2 leave the module housing M through the outlet opening O, the surface of the airbag G located outside of a module housing M and forming a safety cushion is being enlarged, which now reaches in particular to the knee K of the passengers to be protected, compare FIG. 11.

The priority application, German Patent Application Number 10 2008 061 693.1, filed on Dec. 10, 2008 is incorporated by reference herein.

The invention claimed is:

1. A method for folding an airbag for an airbag module, comprising:
    disposing the airbag on a support;
    providing at least one piling element for folding the airbag next to an exterior edge of the airbag disposed on the support; and
    folding the airbag together using the at least one piling element such that the piling element is moved so as to influence the edge of the airbag along the support in a direction toward an interior of the airbag disposed on the support,
    wherein at least one retainer protrudes from the at least one piling element, which is moved together with the piling element during the movement of the piling element for folding the airbag,
    wherein the airbag is prefolded before the at least one retainer movable together with the piling element acts on the airbag for folding the airbag,
    wherein the at least one retainer reaches over or under an edge area of the airbag before the at least one retainer movable together with the piling element acts on the airbag for folding the airbag,
    wherein the at least one retainer acts on the edge area of the airbag such that an undercut is formed in the airbag through an effect of the retainer on airbag sections of the airbag during the movement of the piling element for folding the airbag, and
    wherein, during formation of the undercut through the effect of the retainer on the airbag sections of the airbag, the airbag sections are located below and above the retainer when viewed along a direction vertical to the support.

2. The method according to claim 1, wherein the edge area of the airbag is arranged along the direction vertical to the support above and below the retainer on the piling element.

3. The method according to claim 2, wherein the edge area of the airbag is arranged on the piling element by impact of the retainer protruding from the piling element, fixing means connected to the piling element, or a combination thereof.

4. The method according to claim 1, wherein the at least one piling element comprises at least two piling elements acting on the airbag for folding the airbag.

5. The method according to claim 1, wherein the airbag is folded in a folding space, which is delimited by a cover above the support so that the airbag is folded between the support and the cover.

6. The method according to claim 1, wherein a module housing is provided below the support in which the airbag is stowed after the folding.

7. The method according to claim 6, wherein the airbag is pushed into the module housing after folding by a punch.

8. A method for folding an airbag for an airbag module comprising:
    disposing the airbag on a support;
    providing multiple piling elements for folding the airbag next to an exterior edge of the airbag disposed on the support; and
    folding the airbag together using the piling elements such that the piling elements are moved so as to influence the edge of the airbag along the support in a direction toward an interior of the airbag disposed on the support,
    wherein a retainer protrudes from at least one of the multiple piling elements, which is moved together with the at least one of the multiple piling elements during movement of the piling elements for folding the airbag,
    wherein the retainer reaches over or under an edge area of the airbag before the at least one retainer moves together with the at least one of the multiple piling elements so as to fold the airbag,
    wherein the retainer penetrates during impact on the airbag during the movement of the at least one of the multiple piling elements and forms an undercut,
    wherein, during formation of the undercut through an effect of the retainer on airbag sections of the airbag, the airbag sections are located below and above the retainer as viewed along a direction vertical to the support.

9. The method according to claim 8, further comprising the step of arranging the edge area of the airbag along the direction vertical to the support above and below the retainer on the at least one of the multiple piling elements.

10. The method according to claim 9, wherein the edge area of the airbag is arranged on the at least one of the multiple piling elements by impact of the retainer protruding from the at least one of the multiple piling elements, fixing means connected to the at least one of the multiple piling elements, or a combination thereof.

11. The method according to claim 8, wherein the multiple piling elements comprise at least two piling elements acting on the airbag for folding the airbag.

12. The method according to claim 8, wherein the airbag is folded in a folding space, which is delimited by a cover above the support so that the airbag is folded between the support and the cover.

13. The method according to claim 8, wherein a module housing is provided below the support in which the airbag is stowed after the folding.

14. The method according to claim 13, further comprising the step of pushing the airbag into the module housing after folding by a punch.

* * * * *